US007074856B2

(12) United States Patent
Ho et al.

(10) Patent No.: US 7,074,856 B2
(45) Date of Patent: Jul. 11, 2006

(54) MOISTURE CURE NON-ISOCYANATE ACRYLIC COATINGS

(75) Inventors: Wai-Kwong Ho, North Olmsted, OH (US); Liza A. Capino, Orland Hills, IL (US); Matthew V. Croyle, Cleveland, OH (US); James M. Reuter, Cleveland Heights, OH (US); Richard F. Tomko, North Olmsted, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 10/327,323

(22) Filed: Dec. 20, 2002

(65) Prior Publication Data

US 2004/0122183 A1 Jun. 24, 2004

(51) Int. Cl.
*C08F 8/00* (2006.01)

(52) U.S. Cl. ..................... 525/100; 525/102

(58) Field of Classification Search .............. 525/100, 525/102
See application file for complete search history.

(56) References Cited

U.S. PATENT DOCUMENTS

| 3,453,136 | A | 7/1969 | Bylsma .................... 117/72 |
| 4,026,826 | A | 5/1977 | Yoshida et al. ............ 260/2 S |
| 4,093,673 | A | 6/1978 | Chang et al. .......... 260/824 EP |
| 4,478,990 | A | 10/1984 | Kohno et al. ............... 526/279 |
| 4,491,650 | A | 1/1985 | Rizk et al. ................. 525/102 |
| 4,526,996 | A | 7/1985 | Kilgour et al. ............ 556/413 |
| 4,603,064 | A | 7/1986 | Kania ..................... 427/407.1 |
| 4,614,777 | A | 9/1986 | Kania ........................ 526/279 |
| 4,625,012 | A | 11/1986 | Rizk et al. ................... 528/28 |
| 4,657,986 | A | 4/1987 | Isayama et al. ............ 525/407 |
| 4,788,254 | A | 11/1988 | Kawakubo et al. ......... 525/100 |
| 4,789,710 | A | 12/1988 | Furukawa et al. .......... 525/440 |
| 4,983,700 | A | 1/1991 | Yukimoto et al. ............ 528/34 |
| 5,017,668 | A | 5/1991 | Yoshihoka et al. ......... 526/279 |
| 5,101,055 | A | 3/1992 | Dinh et al. ................. 556/413 |
| 5,115,014 | A | 5/1992 | Wakabayashi et al. ...... 524/506 |
| 5,399,607 | A | 3/1995 | Nanbu et al. ............... 524/385 |
| 5,459,205 | A | 10/1995 | Furukawa et al. .......... 525/846 |
| 5,466,729 | A | 11/1995 | Guillet et al. ............... 523/421 |
| 5,705,561 | A | 1/1998 | Kozakiewicz et al. ...... 524/730 |
| 6,375,789 | B1 | 4/2002 | Katz et al. .................. 156/329 |
| 6,677,047 | B1 * | 1/2004 | Matsumura et al. ......... 428/447 |
| 2002/0040102 | A1 | 4/2002 | Nixon ........................ 525/100 |

OTHER PUBLICATIONS 2 pages of the International Search Report for International Application No. PCT/US03/40357 corresponding to U.S. Appl. No. 10/327,323.

* cited by examiner

*Primary Examiner*—Bernard Lipman
(74) *Attorney, Agent, or Firm*—Vivien Y. Tsang; Robert E. McDonald

(57) ABSTRACT

An ambient temperature curing coating composition comprising the crosslinked reaction product of:
(a) an amino-functional compound, wherein the amino-functional compound is a bis-silylamine of general formula:

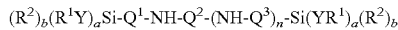

$(R^2)_b(R^1Y)_a Si-Q^1-NH-Q^2-(NH-Q^3)_n-Si(YR^1)_a(R^2)_b$ wherein $n \geq 0$, $a=3-b$, $b=0,1,2$ and wherein each Y is independently a heteroatom, selected from O, N; if Y is N, then the valency of Y is 2; if Y is O, then the valency of Y is 1; each $R^1$ is independently a monovalent radical (e.g., hydrogen, hydrocarbon including but not limited to alkyl (linear or brached), cycloalkyl, aryl, allyl, or aralkyl. Preferably, $R^1$ is an alkyl of 1–10 carbon atoms. Each $R^1$ may be the same or different; $R^2$ is a monovalent radical, and can include heteroatoms (e.g., oxygen, nitrogen, sulfur) not directly bonded to the silicon atom, including but not limited to, alkyl (linear or branched), cycloalkyl, aryl, allyl, or aralkyl. Each $R^2$ may be the same or different. $Q^1$, $Q^2$, $Q^3$ is a divalent bridging group, including but not limited to an alkylene, but preferably is a $C_1$–$C_{12}$ alkylene, and can be branched or cyclic; each Q can be the same or different; and
(b) an acrylic polymer having pendant alkoxysilane and optionally epoxy groups.

The invention can be further crosslinked with reactive polysiloxanes.

20 Claims, No Drawings

MOISTURE CURE NON-ISOCYANATE ACRYLIC COATINGS

BACKGROUND

Many high performance, high solids coating compositions in the art are based on polymeric systems comprised of either polyester-based or polyacrylic-based polyols and crosslinking agents thereof. These coatings are generally supplied as two component or "two-pack" systems. In a typical two-pack system, the crosslinking agent is combined shortly before application, with curing being conducted at ambient or elevated temperatures. While two pack systems often provide high performance properties like corrosion and humidity resistance, resistance to solvents, ultraviolet stability and gloss retention there are notable limitations. Two-pack systems utilizing isocyanate crosslinkers require special handling and storage operations to prevent premature reaction with moisture and to avoid human exposure. Further, the components of two-pack systems can only be mixed shortly prior to use and once mixed must be used and ultimately be discarded. Another disadvantage of isocyanate-crosslinking systems is that the quality of the coating is compromised by bubble formation during thick film application. A more desirable coating composition is an ambient curing, one component or one-pack system where all of the coating ingredients are combined into a single, storage stable mixture. At the same time the one-pack system should exhibit the same high performance film properties as a two-pack system and be isocyanate free.

The coating composition of the present invention is a one-pack acrylic system that has the desired film properties of two-pack polyurethane coatings, such as corrosion and humidity resistance, short dry times, chemical resistance, good ultraviolet resistance and high gloss potential. The coating is moisture-curable, isocyanate-free, and VOC compliant, with a high solids content (>70% by weight) and a low VOC (<3 pounds per gallon). On exposure to moisture, the applied coating composition of the invention is a crosslinked reaction product of bis-silylamine and an acrylic polymer having pendant alkoxysilane groups. The acrylic polymer may also have pendant epoxy groups.

The prior art teaches moisture curable coatings formed from (meth)acrylate polymers containing pendant alkoxysilyl groups. These are described in U.S. Pat. Nos. 3,453,136; 3,453,230; 4,603,064; 4,614,777; 5,017,668; and 5,705,651. U.S. Pat. No. 5,399,607 discloses a mixture of acrylic resins with hydroxyl and alkoxysilyl containing acrylic copolymers to make moisture curable coatings.

U.S. Pat. No. 4,789,710 depicts silanated resins reacted with amino-silanes and further reacted with an isocyanate-ftunctional alkoxysilane. U.S. Pat. No. 5,017,668 describes a long chain amino-silane monomer copolymerized to make a curable acrylic silane polymer. U.S. Pat. No. 5,459,205 discloses a process to make more flexible coatings based on moisture curable resins having long pendant silane-containing moieties. These resins are prepared from silane containing macromonomers copolymerized with conventional monomers. The macromonomers may contain aminosilane moieties; however, the coatings require baking at 60° C. with a tin catalyst.

U.S. patent application Ser. No. 2002/0040102 describes an ambient temperature curing coating composition comprising a polysiloxane, an alkoxysilyl-functional acrylic polymer, and a curing catalyst. The invention further relates to the preparation of an alkoxysilyl-functional acrylic polymer.

We have found that coatings consisting of the silane-functional acrylic polymers and amines, as described in the above prior art, lack the desired solvent resistance of two-pack urethane coatings. Primary aminosilanes such as aminopropyltrimethoxysilane, when reacted with silane-functional acrylic polymers, offer some improved solvent resistance. However, according to this invention, it has been found that coatings consisting of the same silane-functional acrylic polymers, when reacted with secondary aminosilanes such as bis-silylamines, exhibit much improved solvent resistance rivaling that of two-pack urethanes.

SUMMARY OF THE INVENTION

An ambient temperature curing coating composition comprising the crosslinked reaction product of:

(a) an aminosilane-functional compound, wherein the aminosilane-functional compound is a bis-silylamine of general formula:

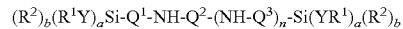

$n \geq 0$ $a = 3-b$ $b = 0, 1, 2$ each Y is independently a heteroatom, selected from O, N; if Y is N, then the valency of Y is 2; if Y is O, then the valency of Y is 1;

each $R^1$ is independently a monovalent radical (e.g., hydrogen, hydrocarbon including but not limited to alkyl (linear or brached), cycloalkyl, aryl, allyl, or aralkyl. Preferably, $R^1$ is an alkyl of 1–10 carbon atoms. Each $R^1$ may be the same or different;

$R^2$ is a monovalent radical, and can include heteroatoms (e.g., oxygen, nitrogen, sulfur) not directly bonded to the silicon atom, including but not limited to, alkyl (linear or branched), cycloalkyl, aryl, allyl, or aralkyl. Each $R^2$ may be the same or different.

$Q^1$, $Q^2$, $Q^3$ is a divalent bridging group, including but not limited to an alkylene, but preferably is a $C_1$–$C_{12}$ alkylene, and can be branched or cyclic; each Q can be the same or different; and (b) an acrylic polymer having pendant alkoxysilane and optionally epoxy groups.

This invention also relates to the ambient curing coating composition above further crosslinked with a polysiloxane.

This invention also relates to articles having the above-claimed cured coating compositions on at least one surface thereof.

DETAILED DESCRIPTION OF THE INVENTION

The one-pack moisture-curable coating composition of this invention comprises a crosslinked reaction product of a bis-silylamine and an acrylic polymer having pendant alkoxysilane and optionally, epoxy groups.

The bis-silylamine of this invention generally has the formula:

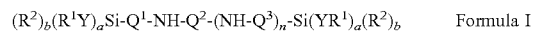 Formula I $n \geq 0$ $a = 3-b$ $b = 0, 1, 2$ each Y is independently a heteroatom, selected from O, N; if Y is N, then the valency of Y is 2; if Y is O, then the valency of Y is 1;

each $R^1$ is independently a monovalent radical (e.g., hydrogen, hydrocarbon including but not limited to alkyl (linear or brached), cycloalkyl, aryl, allyl, or aralkyl. Preferably, $R^1$ is an alkyl of 1–10 carbon atoms. Each $R^1$ may be the same or different;

$R^2$ is a monovalent radical, and can include heteroatoms (e.g., oxygen, nitrogen, sulfur) not directly bonded to the silicon atom, including but not limited to, alkyl (linear or branched), cycloalkyl, aryl, allyl, or aralkyl. Each $R^2$ may be the same or different.

$Q^1$, $Q^2$, $Q^3$ is a divalent bridging group, including but not limited to an alkylene, but preferably is a $C_1$–$C_{12}$ alkylene, and can be branched or cyclic; each Q can be the same or different.

For the purpose of the present invention a bis-silylamine is generally of Formula I described above. Specific examples of these bis-silylamines are bis-(3-trimethoxysilylpropyl)amine, bis-(3-triethoxysilylpropyl)amine, bis-(3-trimethoxysilyl 2-methylpropyl) amine, and bis-(3-triisopropoxysilylpropyl)amine. Also included are asymmetrical secondary silylamines such as N-(3-triethoxysilylpropyl)-N-(5-triethoxysilylpentyl)amine. A bis-silylamine, namely bis-(3-trimethoxysilylpropyl)amine, under the tradename SILQUEST® A-1170, is available from Crompton Corporation. This and similar bis-silylamines can be made according to the methods known in the art, e.g., as taught in U.S. Pat. No. 4,526,996 (see column 5 line 54 through column 11 line 26) and U.S. Pat. No. 5,101,055.

Other examples of bis-silylamines can include bis-silylamines modified with long chain alcohols, branched alcohols, cyclic alcohols, aralkyl alcohols such as benzyl alcohols. Generally, the alcohol exchange can be accomplished by the reaction of bis-silylamine with an alcohol at elevated temperature in the presence of a suitable catalyst. For example, SILQUEST® A-1170 may accommodate the exchange of up to six moles of alcohol, preferably from one to four moles, most preferably 2.5 moles of alcohol. In a preferred process for producing a modified bis-silylamine, the bis-silylamine, the appropriate alcohol and suitable catalyst are charged to the reactor under nitrogen purge and heated to 80° C. The reaction can be followed by alcohol distillation and/or infrared spectroscopy. The preferred catalyst is sodium methoxide from 0.01% to 0.1% by weight on the total charge.

The amount of bis-silylamine or modified bis-silylamine present in the binder composition can be about 1% by weight to about 35% by weight based on the total weight of binder solids. Binder solids include the bis-silylamine crosslinker, the acrylic polymer having pendant alkoxysilane groups, and any reactive diluent.

The bis-silylamines or modified bis-silylamines are blended with an acrylic polymer having pendant alkoxysilane groups, and optionally epoxy groups. These acrylic polymers with pendant alkoxysilane crosslinking groups are related to U.S. patents U.S. Pat. No. 3,453,230, U.S. Pat. No. 5,705,351, U.S. Pat. No. 3,453,136, U.S. Pat. No. 4,026,826, and U.S. Pat. No. 4,093,673. Generally, an acrylic polymer having pendant alkoxysilane groups can be prepared by copolymerising at least two different ethylenically unsaturated monomers whereby at least one of the monomers is an alkoxysilyl-functional ethylenically unsaturated monomer. Examples of ethylenically unsaturated monomers are acrylic esters such as butyl(meth)acrylate, methyl(meth)acrylate, ethyl(meth)acrylate, propyl(meth)acrylate, n-hexyl(meth) acrylate, isopropyl(meth)acrylate, isobutyl (meth)acrylate, 2-ethylhexyl (meth)acrylate, cyclohexyl(meth)acrylate, 2,2,5-trimethylcyclohexyl (meth)acrylate, isobornyl(meth)acrylate, lauryl (meth)acrylate, methacrylonitrile, and vinyl compounds such as styrene, acrylonitrile, alpha methyl styrene, vinyl toluene, and vinyl acetate, wherein the notation (meth) acrylate means acrylate or methacrylate.

An alkoxysilyl-functional ethylenically unsaturated monomer, in general, can be any one of the above-mentioned ethylenically unsaturated monomers functionalized with one or more alkoxysilyl groups. Examples of ethylenically unsaturated monomers functionalized with one or more alkoxysilyl groups are 3-((meth)acryloyloxy)propyltrimethoxysilane which denotes either 3-(methacryloyloxy) propyltrimethoxysilane or 3-(acryloyloxy)propyltrimethoxysilane, 3-((meth)acryloyloxy)propyltriethoxysilane, 3-((meth)acryloyloxy) propyltripropoxysilane [3-((meth) acryloyloxy)propyl]methyldimethoxysilane, [3-((meth) acryloyloxy)propyl]methyldiethoxysilane, [3-((meth)acryloyloxy)propyl]methyldipropoxysilane, [4-((meth) acryloyloxy)butyl]phenyldimethoxysilane, [3-(meth) acryloyloxy)propyl]phenyldiethoxysilane, [3-((meth) acryloyloxy)propyl]phenyldipropoxysilane, [3-((meth) acryloyloxy)propyl]dimethylmethoxysilane, [3-((meth) acryloyloxy)propyl]dimethylethoxysilane, [3-((meth) acryloyloxy)propyl]phenylmethylmethoxysilane and [3-((meth)acryloyloxy)propyl]phenylmethylethoxysilane. 3-(Methacryloyloxy)propyltrimethoxysilane, commonly known as γ-methacryloxypropyltrimethoxysilane or 3-(trimethoxysilyl)propyl methacrylate (Silquest A174 from Crompton Corp.) is one of the preferred monomers in the preparation of the alkoxysilyl-functional acrylic polymer. Modifications to the alkoxysilyl-functional ethylenically unsaturated monomer, such as, for example, replacing the propyl group in Silquest® A174 with longer hydrocarbon chains, branched chains, urethane linkages, polyesters, etc., can also be made. Optionally, a small amount of vinyl silanes such as vinyltrimethoxysilane, vinyltriethoxysilane, etc. may be added with the Silquest A174. The amount of alkoxysilyl-functional ethylenically unsaturated monomers present in the polymer composition can be about 1% to about 50% by weight, preferably 10% to 25% by weight, and most preferably, 10% to 15% by weight, of total monomer.

The acrylic polymer having pendant alkoxysilane groups can be prepared by addition polymerization of ethylenically unsaturated monomers in solution. The polymerization is preferably carried out in a non-functional volatile solvent, such as xylene, toluene, and other aromatics, t-butyl acetate, n-butyl acetate, and other ester solvents. In general, suitable solvents include those that will not polymerize with the monomers, and will not react with the bis-silylamine curing agent or alkoxysilyl functionality. Non-hazardous air pollutants (non-HAPs), non-volatile organic compunds (VOC), halogenated aromatic solvents such as Oxsol 100 (Occidental Chemical) can also be used as non-functional volatile solvents.

The acrylic polymer having pendant alkxoysilane groups can also be made in a blend of solvents and/or reactive diluents of suitable low viscosity. Some or all of the monomers can be pre-dissolved in a diluent, which can be solvents, reactive diluents, or a mixture thereof, but preferably the monomers, together with free radical initiator(s) and any chain transfer agent used, are gradually added to the diluent. Preference is given to the use of a reactive diluent having at least one functional group which is substantially non-reactive with the ethylenically unsaturated monomers and which is capable of reacting with a curing agent to form a polymer network. In accordance with this invention, the reactive diluent is an organic compound of viscosity less than 2 Pa·s (20 Poise) at 25° C. The reactive diluent can be a polysiloxane, in which case, the polysiloxane preferably also has pendant alkoxysilyl groups, such as described by the following formula:

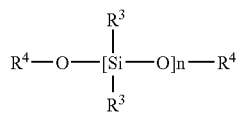

wherein each $R^3$ is selected from the group consisting of alkyl, aryl, and alkoxy groups having up to six carbon atoms, reactive glycidoxy groups, and $OSi(OR^5)_3$ groups, wherein each $R^5$ and R4 independently is selected from the group consisting of hydrogen and alkyl and aryl groups having up to six carbon atoms, and n is selected such that the polysiloxane has a molecular weight of less than about 2000. Suitable polysiloxanes that can be used in the composition according to the present invention include alkoxysilyl-functional polysiloxanes such as DC 3037 and DC 3074 (both from Dow Corning), or SY 231, SY 550, and MSE 100 (all from Wacker). Diluents other than polysiloxanes can include monomeric alkoxysilanes, such as tetraethylorthosilicate, trimethoxypropyl silane and dimethoxydiphenyl silane; and organofunctional monomeric alkoxysilanes, such as glycidoxypropyl trimethoxysilane, and glycidoxypropyl triethoxysilane.

Preferably, the diluent is charged to the reactor, the monomers and chain transfer agent are mixed together as one feed, and the initiator is added in a separate feed. For example, the diluent can be heated to a temperature in the range of 50–200° C., and the monomers, initiator, and chain transfer agent are added over a period of up to 12 hours, preferably in 3 hours, while the temperature of the solution is maintained during the addition and for a further period of 0.5 to 4 hours after the addition. A further charge of initiator may be added during this further period to reduce the level of unreacted monomer. However, it is also possible to reduce this level by distilling off the unreacted monomer from the reaction mixture.

Free radical polymerization is often used in the coatings industry to produce a wide variety of polymers. Resins with narrow molecular weight distributions (polydispersity) are desirable because of the decrease in viscosity due to fewer high molecular weight chains. Conventional free radical solution polymerization produces resins with polydispersities of 2 or greater because radical termination by chain coupling leads to higher molecular weight chains which broadens the molecular weight distribution and increases the viscosity of the polymer solution. Generally, any of the free radical initiators known to the art can be utilized. Suitable free radical initiators include any of the alkyl peroxides such as tert-amyl and tert-butyl peroxides, di-tert-butyl peroxide, peresters such as tert-butyl perbenzoate, tert-butyl peroxy-3,5,5-trimethylhexanoate, 2,5-bis(2-ethylhaxanoyl-peroxy)-2,5-dimethylhexane, or tertiary butyl peroctoate, and any of the various known azo initiators such as 2,2'-azobisisobutyronitrile. Particularly preferred are 2,2'-azobisisobutyronitrile or 2,2'-azo-bis(2-methylbutyronitrile) (Vazo 67 from DuPont). For example, the weight of the free radical initiator used (by weight based on monomers) is generally at least 0.5%. A chain transfer agent such as (3-mercaptopropyl) trimethoxysilane, A-189 (Crompton) is preferably utilized during the free radical polymerization of the invention. In addition, other chain transfer agents could be used with A-189 such as alkyl thiols (e.g. dodecanthiol) and the like. The amount of chain transfer agent used (by weight based on monomers) is generally at least 0.5%, preferably 1 to 10%, or a level of 0.5 to 7% initiator can be used in conjunction with 1 to 10% chain transfer agent.

Controlled radical polymerization reduces polydispersity by reducing termination reactions. Nitroxyl radicals, for example, can be used in controlled radical polymerizations to mediate the polymerization and interfere with the termination reactions by reversibly reacting with a propagating radical. These "living" chains grow at the same rate and produce polymer chains that are homogenous in length and composition. Preferably, the composition of the monomer feed should be the same in every chain and every chain should have nearly the same molecular weight. These living chains also allow the formation of block copolymers or tapered block copolymers by sequentially feeding monomers or mixtures of monomers. Generally, nitroxyl radical generating initiators can include compounds such as N-alkylphosphonate-N-oxylalkyl esters. MONAMS, which is N-alkylphosphonate-N-oxylmethylpropionate, from Atofina is a nitroxide compound that decomposes thermally to produce high solids resins with narrow polydispersities (Proceedings of the Twenty-Ninth International Waterborne, High Solids & Powder Coatings Symposium, $6^{th}$–$8^{th}$ Feb., 2002, New Orleans, La., USA pages 197–210). In accordance with this invention, the MONAMS nitroxide can be used as a free radical initiator to synthesize acrylic polymers having pendant alkoxysilane groups. MONAMS can also be used to polymerize monomers in Dow Corning 3074 reactive polysiloxane to make polymers having pendant alkoxysilane. The polymers can then be formulated with bis-silylamines to produce the coating composition of this invention.

Preferably, the acrylic polymer having pendant alkoxysilane groups comprises a mixture of 1% to 50% by weight trimethoxysilylpropyl methacrylate, 1% to 65% by weight methylmethacrylate, 1% to 50% by weight 2-ethylhexyl acrylate, and 1% to 30% by weight styrene in a diluent. The acrylic polymer having pendant alkoxysilane groups can also be optionally functionalized with one or more pendant epoxy groups, wherein glycidyl methacrylate is a preferred monomer from 0% to 15% by weight of total monomer charge.

In a preferred embodiment, the coating composition comprises from 1% to 35% by weight of the bis-silylamine and from 25% to 99% by weight of the acrylic polymer having pendant alkoxysilane groups, and the remainder being other typical coating components known in the art. Optionally, the coating composition may comprise up to 75% by weight of a polysiloxane. The polysiloxane can be added at several points in the process: 1) as the diluent for the polymerization, 2) after polymerization or 3) during the paint making process.

A coating composition produced from the mixture of the alkoxysilyl-functional acrylic polymer and bis-silylamine is cured by ambient moisture, and thus, a secondary curing agent is not necessary to initiate the curing reaction. To promote rapid cure upon exposure to moisture, the one component coating composition according to the present invention may also comprise a curing catalyst as a secondary component. However, if a curing catalyst is utilized in the coating composition to accelerate cure, the catalyst is normally packaged separately from the silane-containing coating composition. The components are mixed together shortly before application of the coating. The curing catalyst in general can be any curing catalyst active in crosslinking the alkoxysilyl-functional groups present in the acrylic polymer and/or bis-silyl amine and/or in the reactive diluent under the intended conditions of curing. Examples of general classes of catalysts that can be used include basic catalysts (amines or inorganic bases), acidic catalysts (organic and inorganic acids), metal catalysts such as titanium, aluminum, calcium, tin, zirconium, cobalt, etc., and mixtures thereof. The coating compositions of the invention generally cure at ambient temperatures, for example 0 to 30° C. The coating compositions of the invention alternatively can be cured at elevated temperatures, for example from 30° C. to 130° C., to speed up the curing. The VOC for the coatings described in this invention is below 3.0 pounds/gallon or less than 359 grams/liter. However, near 100% solid coatings having a very low measured volatile organic content can be achieved by the use of polysiloxane as a diluent.

Depending on the field of application, the coating compositions of the invention may further comprise one or more additional ingredients common to the paint industry. They may comprise one or more pigments, like titanium dioxide, coloring agents such as yellow or red iron oxide or a phthalocyanine pigment, pigment dispersing agents, light stabilizers, thixotropic agents, and/or one or more strengthening pigments such as micaceous iron oxide or crystalline silica and/or one or more anticorrosive pigments such as metallic zinc, zinc phosphate, wollastonite and/or a filler pigment such as barytes, talc or calcium carbonate. The composition may comprise a thickening agent such as fine-particle sized silica, bentonite clay, hydrogenated castor oil, or a polyamide wax.

The coating compositions of the invention in general can be used as finish coatings and/or primer coatings. Finished coating compositions exhibit high gloss which is retained remarkably well on weathering and UV exposure. They are particularly suitable for coating substrates which are exposed to weather for long periods. The highest levels of gloss may be achieved if the coating composition includes an organic solvent such as xylene. The coating composition may also contain an alcohol, e.g. methanol, ethanol or other alcohols which has the added benefit of improving stability.

A finish coating according to the invention can be applied over various unprimed or primed coating surfaces. The coating composition can be used as a finished coat on concrete, buildings, steel structures, automobiles, aircraft and other vehicles, general industrial machinery and wood. The finished coat can be either pigmented or clear (non-pigmented). The coating composition can also be applied directly to metal substrates like Bonderite, cold rolled steel, galvanized steel, hot dipped steel, blasted steel, and aluminum.

The coating composition of the invention alternatively can be used as a protective primer coating, particularly on steel surfaces, for example bridges, pipelines, industrial plants or buildings, oil and gas installations, or ships. For this use it is generally pigmented with anticorrosive pigments. Primer coating compositions according to the invention can be used as maintenance and repair coatings on less than perfect surfaces such as aged blasted steel, hand-prepared weathered steel, and aged coatings. These primer coating compositions can be readily topcoated, particularly with the coatings of this invention with good inter-coat adhesion.

The invention will be elucidated with reference to the following examples. These are intended to illustrate the invention but are not to be construed as limiting in any manner the scope thereof.

EXAMPLES

Resin Examples 1 & 2

Silanated Polyacrylate Resin Synthesis is shown in Table 1.

TABLE 1

| | Component | Resin Example 1 | Resin Example 2 |
|---|---|---|---|
| Charge Monomers | Xylene | 38.6 | 25.98 |
| | Isobutylmethacrylate | 43.1 | |
| | Methyl Methacrylate | | 21.28 |
| | 2-ethyl hexyl acrylate | 7.1 | 20.71 |
| | Styrene | | 13.39 |
| | Gamma-methacryloxypropyl-trimethoxysilane | 7.8 | 10.49 |
| | Mercaptopropyl-trimethoxysilane | | 2.79 |
| Initiator | Vazo 67 | 0.53 | 1.34 |
| Chase | Vazo 67 | .05 | .25 |
| | Xylene | 2.9 | 3.76 |
| | NVM* | 58% | 69% |

*Non-volatile material

Charge xylene to the reactor and heat to 90° C. Feed monomers and initiator over 3 hours in a nitrogen atmosphere. Hold for one hour. Heat to 95° C. and feed chase over 3 hours. Heat to 99° C. and hold for one hour. Cool and filter resin through a 150 micron bag.

Crosslinker Examples 3 and 4

Synthesis of bis-silylamine crosslinker by alcohol exchange

TABLE 2

| | Component | Crosslinker Example 3 | Crosslinker Example 4 |
|---|---|---|---|
| Bis(silyl)amine | A-1170 Bis(3-trimethoxysilylpropyl) Amine | 100 | 51.2 |
| Alcohol | 2-ethylhexanol | | 48.7 |
| Catalyst | Sodium Methoxide | | 0.1 |

Charge the 2-ethyl hexanol, A-1170, and sodium methoxide to the reactor. Heat to 80° C. Turn on nitrogen sparge and collect methanol in a Dean Stark trap. Once methanol no longer distills, reaction is complete. Confirm by IR.

Paint Examples 5–8

Paint Examples 5 and 6 are clear paints produced using Resin Samples 1 and 2, and Crosslinker Examples 3 and 4. Paint Examples 7 and 8 are comparative examples that contain primary mono-silylamine crosslinker, 3-aminopropyltrimethoxysilane, A-1100 from Crompton Corporation.

TABLE 3

| | Paint example | | | |
|---|---|---|---|---|
| | 5 | 6 | 7 | 8 |
| Resin example | 1 | 1 | 1 | 1 |
| Crosslinker example | 3 | 4 | A-1100 | A-1100 |
| Parts by weight: | | | | |
| Resin | 100 | 100 | 100 | 100 |
| Crosslinker | 10.70 | 21.40 | 6.95 | 13.85 |

The chemical resistance results of paint examples 5, 6, 7, and 8 are coated on Bonderite B-1000 panels and cured at 140° F. for 30 minutes. The chemical resistance is tested on the coatings for 24 hours at ambient conditions. The results are tabulated in Table 4.

TABLE 4

| | Paint example | | | |
|---|---|---|---|---|
| | 5 | 6 | 7 | 8 |
| Toluene | No effect | No effect | delamination | delamination |
| Methyl ethyl ketone | No effect | No effect | delamination | delamination |
| 10% $H_2SO_4$ | No effect | No effect | No effect | discoloration |
| 10% NaOH | No effect | No effect | No effect | discoloration |

Paint Examples 9–12

Paint Examples 9 and 10 are pigmented paints produced with Resin Example 2 and Crosslinker Examples 3 and 4 as described above. Paint examples 11 and 12 are comparative examples containing a primary mono-silylamine crosslinkers such as 3-aminopropyltrimethoxysilane (A-1100), and 3-aminopropyltriethoxysilane (A-1110), respectively, both from Crompton Corporation.

TABLE 5

| | Paint example | | | |
|---|---|---|---|---|
| | 9 | 10 | 11 | 12 |
| Resin example | 2 | 2 | 2 | 2 |
| Crosslinker example | 3 | 4 | A-1100 | A-1110 |
| Parts by weight: | | | | |
| Resin | 54.16 | 52.37 | 52.99 | 55.31 |
| Crosslinker | 5.36 | 8.49 | 3.40 | 2.87 |
| Dispersant[1] | 1.72 | 1.66 | 1.68 | 1.76 |
| $TiO_2$[2] | 34.42 | 33.28 | 33.68 | 35.15 |
| Xylene | 4.33 | 4.19 | 8.24 | 4.91 |
| NVM* | 78.00 | 79.00 | 75.00 | 77.00 |

*Non-volatile material by weight
[1]Dispersant A-1230 from Crompton Corporation.
[2]Titanium dioxide CR-828 from Kerr McGee.

The chemical resistance results of paint examples 9, 10, 11 and 12 are coated on Bonderite B-1000 panels and cured for 30 days at 25° C. and 50% relative humidity. The chemical resistance is tested on the coatings for 24 hours at ambient conditions. The results are tabulated in Table 6.

TABLE 6

| | Paint example | | | |
|---|---|---|---|---|
| | 9 | 10 | 11 | 12 |
| Formula 409 cleaner | No effect | No effect | No effect | Visible stain |
| Ethanol | No effect | No effect | No effect | Visible stain |
| Methyl ethyl ketone | Visible stain | No effect | Visible stain | Visible stain |
| Methyl amyl ketone | No effect | No effect | Visible stain | Visible stain |
| Methyl isobutyl ketone | Very slight stain | No effect | Very slight stain | Visible stain |
| Unleaded gasoline | Very slight stain | No effect | Very slight stain | Visible stain |

The invention claimed is:

1. An ambient temperature curing coating composition comprising the crosslinked reaction product of:
   (a) an amino-functional compound, wherein the amino-functional compound is a bis-silylamine of formula:

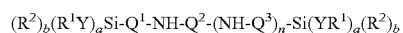

$n \geq 0$
   $a = 3-b$
   $b = 0, 1$ or $2$
   each Y is independently a heteroatom is selected from O or N; if Y is N, then the valency of Y is 2; if Y is O, then the valency of Y is 1;
   each $R^1$ is independently a monovalent radical selected from the group consisting of hydrogen, hydrocarbon including but not limited to linear alkyl, or branched alkyl, cycloalkyl, aryl, allyl, or aralkyl; each $R^1$ may be the same or different;
   $R^2$ is a monovalent radical, wherein $R^2$ can optionally include a heteroatom selected from the group consisting of oxygen, nitrogen, sulfur, wherein $R^2$ is not directly bonded to the silicon atom, and wherein $R^2$ is linear or branched alkyl, cycloalkyl, aryl, allyl, or aralkyl, and wherein each $R^2$ may be the same or different;
   $Q^1$, $Q^2$, $Q^3$ is a divalent bridging group, including but not limited to an alkylene and can be branched or cyclic; each Q can be the same or different; and
   (b) an acrylic polymer having pendant alkoxysilane and optionally epoxy groups.

2. The coating composition of claim 1 wherein the crosslinked reaction product further comprises a reactive diluent.

3. The coating composition of claim 2, wherein the reactive diluent is a polysiloxane.

4. The coating composition of claim 3, wherein the polysiloxane has the formula:

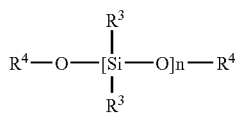

wherein each $R^3$ is selected from the group consisting of alkyl, aryl, and alkoxy groups having up to six carbon atoms, reactive glycidoxy groups, and $OSi(OR^5)_3$ groups, wherein each $R^5$ and $R^4$ independently is selected from the group consisting of hydrogen and alkyl and aryl groups having up to six carbon atoms, and n is selected such that the polysiloxane has a molecular weight of less than about 2000.

5. The coating composition of claim 1 wherein the bis-silylamine is at least one percent by weight of the total coating composition.

6. The coating composition of claim 1 wherein the bis-silylamine is between about 1 percent by weight and about 35 percent by weight of the coating composition.

7. The coating composition of claim 1, wherein the composition comprises from about 1 percent by weight to about 35 percent by weight of the bis-silylamine and from about 25 percent by weight to about 99 percent by weight of the acrylic polymer having pendant alkoxysilane groups.

8. The coating composition of claim 1, wherein the bis-silylamine is selected from the group consisting of bis-(3-trimethoxysilylpropyl)amine, bis-(3-triethoxysilylpropyl)amine, bis-(3-trimethoxysilyl 2-methylpropyl) amine, bis-(3-triisopropoxysilylpropyl)amine, and N-(3-triethoxysilylpropyl)-N-(5-triethoxysilylpentyl)amine.

9. The coating composition of claim 1, wherein the bis-silylamine is modified by alcohol exchange.

10. The coating composition of claim 1, further comprising a curing catalyst.

11. The coating composition of claim 1, wherein the acrylic polymer having pendant alkoxysilane groups is prepared by free radical polymerization.

12. The coating composition of claim 10, wherein the reaction product comprises nitroxyl radicals.

13. The coating composition of claim 10, wherein the reaction product comprises multinitroxyl radicals.

14. The coating composition of claim 10, wherein the free radical polymerization utilizes an N-alkylphosphonate-N-oxylalkyl ester initiator.

15. The coating composition of claim 13, wherein the an N-alkylphosphonate-N-oxylalkyl ester initiator is N-alkylphosphonate-N-oxylmethylpropionate.

16. A process for the preparation of a coating composition comprising:
(a) combining an amino-functional compound, wherein the amino-functional compound is a bis-silylamine of formula:

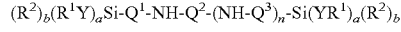

$n \geq 0$
$a = 3-b$
$b = 0, 1$ or $2$ each Y is independently a heteroatom, selected from O, N; if Y is N, then the valency of Y is 2; if Y is O, then the valency of Y is 1;

each $R^1$ is independently a monovalent radical is selected from the group consisting of hydrogen, hydrocarbon including but not limited to linear alkyl or branched alkyl, cycloalkyl, aryl, allyl, or aralkyl; each $R^1$ may be the same or different;

$R^2$ is a monovalent radical, wherein $R^2$ can optionally include a heteroatom selected from the group consisting of oxygen, nitrogen, sulfur, wherein $R^2$ is not directly bonded to the silicon atom, and wherein $R^2$ is linear alkyl or branched alkyl, cycloalkyl, aryl, allyl, or aralkyl, and wherein each $R^2$ may be the same or different;

$Q^1$, $Q^2$, $Q^3$ is a divalent bridging group, including but not limited to an alkylene and can be branched or cyclic; each Q can be the same or different;

(b) an acrylic polymer having pendant alkoxysilane and optionally epoxy groups.

17. The process of claim 16, further comprising modifying the bis-silylamine by alcohol exchange.

18. The process of claim 16, further comprising preparing the acrylic polymer having pendant alkoxysilane groups by free radical polymerization.

19. The process of claim 16 further crosslinked with a polysiloxane.

20. The process of claim 16, further comprising combining a polysiloxane of the general formula:

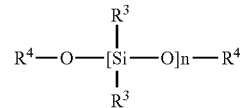

wherein each $R^3$ is selected from the group consisting of alkyl, aryl, and alkoxy groups having up to six carbon atoms, reactive glycidoxy groups, and $OSi(OR^5)_3$ groups, wherein each $R^5$ and $R^4$ independently is selected from the group consisting of hydrogen and alkyl and aryl groups having up to six carbon atoms, and n is selected such that the polysiloxane has a molecular weight of less than 2000.

* * * * *